United States Patent [19]

Yalvac et al.

[11] Patent Number: 5,422,055
[45] Date of Patent: Jun. 6, 1995

[54] REINFORCED GLASS AND/OR CERAMIC MATRIX COMPOSITES

[75] Inventors: Selim Yalvac; Robert L. McGee, both of Midland, Mich.

[73] Assignee: The Dow Chemical Company, Midland, Mich.

[21] Appl. No.: 43,250

[22] Filed: Apr. 6, 1993

Related U.S. Application Data

[60] Continuation of Ser. No. 482,381, Feb. 20, 1990, abandoned, which is a continuation-in-part of Ser. No. 469,979, Jan. 25, 1990, abandoned, which is a division of Ser. No. 122,317, Nov. 18, 1987, abandoned, which is a continuation-in-part of Ser. No. 776,713, Sep. 16, 1985, abandoned.

[51] Int. Cl.⁶ .............................................. B28B 1/26
[52] U.S. Cl. ................................. 264/86; 264/332
[58] Field of Search .............. 264/86, 332; 65/4.4

[56] References Cited

U.S. PATENT DOCUMENTS

| | | | |
|---|---|---|---|
| 3,607,608 | 9/1971 | Siefert | 501/35 |
| 3,681,187 | 8/1972 | Bowen et al. | 161/170 |
| 4,231,169 | 11/1980 | Toyama et al. | 428/408 |
| 4,263,367 | 4/1981 | Prewo | 428/408 |
| 4,265,968 | 5/1981 | Prewo | 428/408 |
| 4,269,887 | 5/1981 | Sonobe et al. | 428/297 |
| 4,447,345 | 5/1984 | Kummermehr et al. | 428/297 |
| 4,485,179 | 11/1984 | Brennan et al. | 501/32 |
| 4,511,663 | 4/1985 | Taylor | 428/408 |
| 4,554,197 | 11/1985 | Chyung | 428/408 |
| 4,610,917 | 9/1986 | Yamamura et al. | 428/408 |
| 4,615,987 | 10/1986 | Chyung et al. | 501/8 |
| 4,626,515 | 12/1986 | Chyung et al. | 501/95 |
| 4,659,624 | 4/1987 | Yeager et al. | 428/408 |
| 4,690,851 | 9/1987 | Auduc et al. | 428/408 |
| 4,755,489 | 7/1988 | Chyung et al. | 501/8 |
| 4,835,046 | 5/1989 | Auduc et al. | 428/408 |
| 4,960,629 | 10/1990 | Jarmon et al. | 428/408 |
| 4,992,321 | 2/1991 | Kandachi et al. | 501/39 |

FOREIGN PATENT DOCUMENTS

| | | |
|---|---|---|
| 0077444 | 4/1983 | European Pat. Off. |
| 60-149403 | 8/1985 | Japan |
| 5202368 | 4/1940 | United Kingdom |
| 1279252 | 6/1972 | United Kingdom |

OTHER PUBLICATIONS

Sambell et al., "Carbon Fibre Composites with Ceramic End Glass Matrices", Journal of Materials Science, 7, (1972) pp. 663–675.

Primary Examiner—James Derrington

[57] ABSTRACT

A process for preparing a fiber reinforced, glass matrix composite article of manufacture. The process employs an aqueous wet-laid technique by forming a dilute aqueous slurry of solids comprising glass fibers, reinforcing fibers and binder material which may be partially or completely fibrous. The dilute aqueous slurry is destabilized and the solids are collected on a porous support means. They are then dewatered and dried to form the composite mat which can be hot-pressed into an article of manufacture. The hot-pressed article of manufacture may then be heated, in the absence of pressure, to a temperature above the softening point of the glass, but below the degradation temperature of the reinforcing fibers, to provide a lofted composite.

8 Claims, No Drawings

[5,422,055]

REINFORCED GLASS AND/OR CERAMIC MATRIX COMPOSITES

CROSS REFERENCE TO RELATED APPLICATIONS

This is a continuation of application Ser. No. 07/482,381 filed Feb. 20, 1990, now abandoned, which is a continuation-in-part of application Ser. No. 07/469,979, filed Jan. 25, 1990, now abandoned, which is a division of application Ser. No. 07/122,317 filed Nov. 18, 1987, now abandoned, which is a continuation-in-part of application Ser. No. 06/776,713, filed Sep. 16, 1985, now abandoned.

BACKGROUND OF THE INVENTION

The present invention concerns a process for preparing reinforced glass matrix composites.

Generally, fabrication of glass matrix composites is accomplished by impregnating a mat of fibrous material with a glass slurry. The impregnated fibers are then dried and stored as a prepreg or used directly. In any case, they are cut into desired form and molded under pressure and heated to fuse the glass matrix. Typical preparations as described above are disclosed in U.S. Pat. Nos. 4,511,663 and 4,485,179.

U. K. Patent Application 52023/68 discloses a technique where a continuous length of glass fibers is first pulled over and under spreading rollers to form a tape and then into a bath containing a glass powder slurry. Excess slurry is removed from the wet tape before it is wound onto a flat-sided drum so that the turns bond together. The turnings are removed and hot pressed. Modifications of this process can be found in U.S. Pat. No. 3,681,187.

U.S. Pat. No. 4,263,367 attempts to improve the reinforcement of glass matrix composites by employing premanufactured isotropically laid, i.e., in-plane randomly oriented fiberst graphite paper mats. After removing the binder material from the mats by solvent immersion or burning, the mats are dipped into a glass slurry. The mats are then stacked with alternating layers of powdered glass and hot pressed. The randomly oriented reinforcing fibers provide enhanced mechanical strength to the glass matrix composites.

Still another attempt to prepare glass matrices with reinforcing fibers is described in the article by Sambell, Bowen and Phillips, "Carbon Fiber Composites with Ceramic and Glass Matrices", *Journal of Material Science*, 7 (1972) at 663. Their process involves dispersing chopped carbon fibers and powdered matrix material in isopropyl alcohol. The mixture is continuously agitated while the alcohol is removed by infrared radiant heat until the mixture has a stiff consistency. The mixture is then loaded into a die assembly and hot pressed.

While the above methods are satisfactory, they are quite labor intensive. Simple, more efficient methods with good composition control are desired.

SUMMARY OF THE INVENTION

The present invention is a process for preparing a fiber-reinforced, glass matrix composite article of manufacture comprising:
 a. forming a dilute, aqueous slurry having a solids component comprising (1) reinforcing fibers, (2) glass fibers, and (3) at least one binder material;
 b. destabilizing said aqueous slurry;
 c. collecting said solids component on a porous support;
 d. dewatering and drying said collected solids to form a dried composite mat wherein the reinforcing fibers and the glass fibers are comingled and randomly oriented in the plane of the mat;
 e. stacking a plurality of said mats or sections thereof and hot pressing said stack under conditions sufficient to fuse the glass fibers into a continuous glass matrix while substantially eliminating the binder material and retaining the integrity of the reinforcing fibers. The process provides precise control of the volume fraction of the reinforcing material relative to the matrix material because loss of the matrix material during processing is negligible.

In a related embodiment, the present invention is a process for preparing a lofted version of the fiber-reinforced, glass matrix composite article of manufacture by adding sequential step:
 f. heating the hot-pressed composite article, in the absence of pressure, to a temperature above that at which softening of the glass matrix occurs but below that at which the reinforcing fibers degrade and maintaining the composite article within that temperature range for a period of time sufficient to cause the composite article to increase in thickness.

DETAILED DESCRIPTION OF THE INVENTION

The process of the present invention includes a number of steps, the first of which is forming a dilute aqueous slurry or suspension of a solids component. The solids component comprises glass fibers, reinforcing fibers and at least one binder material. The binder material(s) may also be fibrous. The slurry is then destabilized and wet-laid onto a porous support to form a composite mat. The composite mat is then dewatered and dried to form a dried mat wherein the glass fibers, the reinforcing fibers and, if present, the fibrous binding material are comingled and randomly oriented in the plane of the mat. Although a single mat or segment thereof may then be hot pressed to form a fiber-reinforced glass composite article, beneficial results are obtained when two or more mats, or segments thereof, are stacked together before hot pressing.

The present process provides a number of benefits. First, it facilitates incorporation of various ingredients which make up the solids component. Second, it gives random orientation of the reinforcing fibers within both the dried mat and the resultant glass matrix composite article. The random orientation provides mechanical properties in the plane of the sheet which are quasi-isotropic, or generally the same regardless of direction. Third, it allows preparation of a consistent product wherein the volume fraction of reinforcing fibers relative to the glass matrix in the resultant article of manufacture is reproducible and generally identical to the volume fraction of the reinforcing fibers relative to the glass fibers in the solids component of the dilute aqueous slurry.

The process involves dispersing, in an aqueous media, the glass fibers which form the matrix following heat consolidation of the mats, reinforcing fibers and at least one binder material. Beneficial results are obtained when at least a portion of the binder material is in the form of fibers, e.g., polyolefin fibers. The use of fibers for most, if not all, of the solids component aids in mat formation and collection, minimizes loss of solids and maximizes reproducibility of results. The order of addition of the glass fibers, reinforcing fibers and binder material(s) is not critical. However, desirable results are obtained when the glass fibers are added to the aqueous medium after the reinforcing fibers and binder material(s) are well dispersed.

Glass fibers suitable for purposes of the present invention are those which are dispersible in an aqueous medium and which can be deformed under heat and pressure to fuse into a unitary structure. Soda lime glass, borosilicate glass, quartz and lithium aluminum-silicate glass form suitable glass fibers. The glass fibers usually make up from about 45 to about 97 percent by volume of the solids component. If the amount of glass fibers exceeds about 97 volume percent, one cannot attain sufficient reinforcement of the glass matrix composite article of manufacture. If the amount of glass fibers falls short of about 45 volume percent, it is believed there will be "matrix starvation" or an insufficient amount of matrix material to fill spaces between the reinforcing fibers following hot pressing of the mats into an article of manufacture.

Reinforcing fibers are suitably selected from the group consisting of graphite fibers, metal coated graphite fibers, silica fibers, quartz fibers, ceramic fibers, metal fibers and mixtures thereof. The metal of the metal fibers and the metal coated graphite fibers should, under the hot pressing conditions, be substantially inert to materials of construction for molds used in hot pressing. The reinforcing fibers are beneficially stainless steel fibers or nickel coated graphite fibers.

The metal coating need not be nickel. U.S. Pat. No. 4,511,663, the teachings of which are incorporated herein by reference, discloses the use of the following metals: Y, Zr, Nb, Mo, Ag, Cd, Ta, W, Zn, Cu, Co, Fe, Mn, Ga, V, Ti, Sc, Al, Mg, Au and Pt. Magnetic or electrical properties of the metals are transferred to the resultant article of manufacture provided sufficient metal is present. Silicon carbide fibers, as disclosed in U.S. Pat. No. 4,485,179, can also be used.

The amount of reinforcing fibers is suitably from about 3 to about 35 percent by volume of the solids component. Amounts of reinforcing fibers of less than about three volume percent provide inadequate reinforcement. Amounts in excess of about 35 volume percent are believed to result in matrix starvation.

The reinforcing fibers are essentially uniformly dispersed throughout the glass matrix composite articles formed in accordance with the process of the present invention and randomly oriented in the plane defined by said articles, i.e., there is substantially no preferred orientation of the fibers in the x, y direction. The uniform dispersal and random orientation of the reinforcing fibers is also present in the dried mats from which the glass matrix composite articles of manufacture are formed. The fibers employed have an average length of at least 0.125 inch (3 mm), preferably 0.18 inch (4 mm) up to 1.00 inch (25 mm), preferably 0.75 inch (19 mm).

The binder material is one which effectively assists in the collection of the solids component from the dilute aqueous slurry so they can be destabilized and formed into a mat. Generally, the binder can be in the physical form of a fiber, powder, particle or aqueous dispersions thereof. Typical binder materials include starch, latex dispersions, synthetic polymers and natural polymers. The binder material is beneficially a synthetic or natural polymer.

The binder material is generally present in an amount of from about 1 percent to about 20 percent by volume of the solids component. The amount is desirably from about 5 to about 15 volume percent. It has been found that with less than about one volume percent of binder, formation of an integral, composite mat is quite difficult. On the other hand, with greater than about twenty volume percent of binder, hot pressing time is uneconomically increased in an effort to burn off or volatilize the binder. In addition, elimination of resulting porosity is difficult, if not impossible, within an economically reasonable period of time.

Latex binders having anionic or cationic bound charges in an amount sufficient to provide stabilization of the colloid can be employed if desired. Where necessary, a polymeric flocculant opposite in charge to the charged binder can be employed to aid in the destabilization of the colloid.

The binder material is desirably an ethylene/acrylic acid copolymer, a polyolefin fiber or a mixture of the copolymer and the polyolefin fiber. Illustrative fibrous binder materials include those formed from polyethylene, polypropylene, polyvinylchloride, polyester, polystyrene, and acrylonitrile/butadiene/styrene copolymers.

The binder material is desirably a combination of an ethylene/acrylic acid copolymer and polyolefin fibers. This combination is advantageous because the ethylene/acrylic acid copolymer, when flocculated, enhances the wet strength of the collected solids component, or "wet mat". The polyolefin fibers add stiffness to the dried composite mat and aid in predensification thereof, presumably by melting and then solidifying.

In addition to the above three main components, other additive-type materials can be admixed in the aqueous slurry so long as they do not interfere with preparation of the glass matrix composite articles of manufacture or substantially degrade the properties thereof. For example, other fibrous materials and particulate fillers can be added to form hybrid composites. Also, colorants, processing aids such as thickeners, flocculants and pH adjusters can be included as well.

Filler materials are not an essential component of the glass matrix composite articles of manufacture prepared in accordance with the present invention. If used, filler materials may be in the form of powders or, preferably, fibers. Although particulate fillers are generally satisfactory, some loss thereof during processing is expected. Suitable particulate fillers include carbon blacks, metallic powders and other materials which are inert or non-reactive under process conditions of the present invention. Combinations of fibrous and particulate fillers can also be used. Illustrative filler material levels fall within a range of from about 0 to about 15, desirably from about 0.5 to about 10 percent by volume, based on total volume of solids materials.

The glass matrix composite articles of manufacture are formed, in accordance with the present invention, by a multi-step process. A dilute aqueous slurry is formed by dispersing the solids component comprising glass fibers, reinforcing fibers and at least one binder material in water. The slurry is then destabilized and the solids component is collected on a porous support. Collection can be assisted by vacuum. The collected solids component is dewatered and dried to form a dried mat. A single dried mat, or section thereof, may be hot pressed into a fiber-reinforced, glass matrix composite article of manufacture. Preferred results in terms of thickness and strength are obtained, however, when at least two dried mats or sections thereof are stacked together and then hot pressed.

If desired, a thickener may be added to the water in an amount sufficient to improve dispersion of the solids component. Also, any part of the solids component can be added in predispersed form to assist in forming a generally uniform dispersion of the solids component. The dried mat(s) may be partially densified before hot pressing.

The dried composite mat, whether densified fully, partially or not at all, can be stored as a prepreg or used directly. In any event, the composite mat is ultimately subjected to hot pressing to completely densify the composite mat(s), fusing the glass fibers into a continuous matrix while retaining the generally uniform distribution and random orientation of the reinforcing fibers. Hot pressing also serves to bond the glass matrix to the reinforcing fibers and, if present, filler materials and other additives. The binder materials, volatilized during hot pressing, are not present in the finished article of manufacture. The hot-pressed composite is then cooled and removed from the pressurizing device employed.

The hot-pressed article of manufacture can be further modified as desired by placing the article, or a portion thereof, in an air oven and heating it to a temperature above the softening temperature of the matrix material, e.g., 840° C., and maintaining that temperature for up to an hour or more. The oven is then turned off and allowed to cool. The cooled article is "lofted" in that it has a greater thickness and a lower density without loss of material. Increases in thickness of at least 5 percent, e.g., from about 5 to about 100, desirably from about 10 to about 50, percent by volume based upon total volume of solids, are readily obtained. Increases in thickness are calculated by dividing the difference in thickness by the original thickness (thickness before heating and lofting). The lofting is believed to enhance both the flexural and insulating properties of the article of manufacture.

The collected and dried mats can be manufactured on conventional paper-making apparatus such as a sheet mold, Fourdrinier or cylinder machines.

The process of the present invention is illustrated by the following examples wherein all parts and percentages are by volume unless otherwise specified. Volume percentages for the hot-pressed composite mats are based upon the assumption that loss of matrix material, most likely during the hot pressing step, is, for all practical purposes, zero. The binder materials are, of course, volatilized during processing. Examples of the present invention are identified by Arabic numerals whereas comparative examples are identified by capital alphabetic characters.

Example 1

Thicken 28 liters of water with 1 gram of xanthan gum. Approximately 19 g of a styrene/butadiene latex (50 weight percent solids) binder are added, with stirring to the thickened water. Next, 233 g of glass fibers of a length about 13 mm and diameter of 13 μm and 60.6 g of nickel-coated graphite fibers having a diameter of 7 μm and a length of 4 mm are added the aqueous media and stirred until a uniform dispersion is obtained. The uniform dispersion is destabilized with a cationic flocculant available under the trade name Betz 1260. The water is then drained and the solids are collected on a screen. The composite mats thus formed are dewatered by pressing and then dried.

The dried composite mats are packed into a mold cavity 63 mm deep which is placed in a furnace and purged with argon to remove oxygen. The furnace is then evacuated to a pressure of 1.92 mm Hg and the temperature gradually increased to 1,245° C. After about 20 minutes the pressure is increased to 2,070 psi (14.3 MPa) and the temperature is allowed to decrease at a rate of about 130°–140° C. per hour. At about 890° C., pressure is decreased to 230 psi (1.6 MPa) to prevent microcracking during solidification. The furnace is further cooled and the press opened.

Considerable flash of glass existed on and about the mold. The sample removed from the mold weighed 30.69 g and had a density of 2.462 g/cc.

The composition of the sample was determined by grinding a small portion of the sample. The small ground portion was heated to 750° C. in an air atmosphere to burn off the carbon fibers for 15 minutes. A weight loss of 27.26 percent occurred and is attributed to carbon fibers. The burned off sample was next reportedly etched with concentrated nitric acid to dissolve the nickel, a weight loss of 22.32 percent occurred. The nickel coated graphite fibers were thus determined to be 45.02 weight percent nickel. This value corresponds favorably with the manufacturer's report of 47–50 percent nickel content.

Various volumes are reported for the density of graphite fibers, from 1.75 g/cc to 1.82 g/cc. The observed composition of the composite is:

|  | Weight Percent | Volume Percent* | Volume Percent** |
| --- | --- | --- | --- |
| Glass | 50.42 | 52.33 | 53.17 |
| Graphite Fiber | 27.26 | 41.06 | 40.12 |
| Nickel | 22.32 | 6.61 | 6.72 |

*Graphite density taken as 1.75 g/cc.
**Graphite density taken as 1.82 g/cc.

A specimen of the glass matrix composite, as prepared above, is prepared for measurement with a strain gauge. The measurements show an average flexural strength of 24,100 psi (166 MPa) and an average flexural modulus of 6,185,000 psi (42.6 GPa). The tensile strength is 8,900 psi (61 MPa) and the tensile modulus is 6,920,000 psi (47.7 GPa). The specimen exhibits these physical properties in a quasi-isotropic fashion, meaning that the strength is the same in any direction within the plane of the specimen tested.

The bulk conductivity of the glass matrix composite is 132 $(\Omega cm)^{-1}$. This value is very close to the conductivity of metals, e.g., aluminum alloy 380 or nickel.

Magnetic properties of the glass matrix composite include a measured saturation value which averages 15.85 emu/g. This corresponds to a 24.38 percent nickel content (the saturation value for pure nickel is 65 emu/g).

The glass matrix composite, when further examined with a scanning electron microscope, exhibits good bonding (or wetting) between the glass and the dispersed fibers. Less bonding is seen at the molded surfaces. This can be attributable to the high nickel coated graphite fiber content. Bonding can be improved by employing lower amounts of reinforcing fiber.

Further analysis of the composite by energy dispersive x-ray spectroscopy reveals dewetting of the nickel from the surface of the graphite fibers. This phenomenon is believed to be easily correctable simply by varying the mold conditions.

In summary, this Example demonstrates the successful preparation of glass matrix composites by an aqueous wet-laid technique.

Example 2

Four liters of water are thickened with 0.5 grams of xanthan gum. To the thickened water, approximately 1.40 grams of 25% solids ethylene acrylic acid copolymer dispersion in water (commercially available from The Dow Chemical Company under the trade designation Primacor ® 4983, the solids portion is 20 weight percent acrylic acid, having a melt index of 300) are added with stirring. Next, approximately 2.02 grams of 60% solids polyethylene minifiber pulp (commercially available from Lextar, a Hercules-Solvay Company, under the trade designation Pulpex E ®), predispersed in a blender, are added. This is followed by the addition of 12.97 grams of 6.35 mm long quartz fibers (commercially available from J. P. Stevens Co. under the trade designation Astroquartz ® 556) fibers and 4.33 grams of 9 mm long siliconcarbide(SiC) fibers having a diameter of 10 to 15 $\mu$m (commercially available from Dow Corning Corporation under the trade designation Nicalon ®). All of the ingredients are stirred until a uniform dispersion is obtained. The pH is then adjusted to four with glacial acetic acid to destabilize the slurry. The destabilized slurry is drained onto a sheet forming screen and formed into a mat. The mat is passed through nip rolls to remove excess water and then dried. Each mat formed in this manner is approximately one (1) mm in thickness and has excellent wet and dry strength.

Four of the mats are stacked together and premolded for five minutes at 200° C. and 350 psi (2.4 MPa) in order to melt the binders and partially densify the mats. The resulting partially densified mat is consolidated to 1.5 mm thickness, or approximately 25% of the final finished theoretical density.

Nine round discs of the partially densified mat are cut and firmly stacked in a graphite die set (mold).

Graphite foil is used to line the die to prevent sticking. The die set is placed into the vacuum furnace and pressed. The mold is heated in an argon purged vacuum to 600° C. in 20 minutes. The vacuum during the cycle is 0.13 atm.

At 20 minutes elapsed time pressure is applied at 113 psi (779 KPa). The temperature is then increased to 1645° C. in 60 minutes more and the pressure is increased to 8500 psi (58.6 MPa). While maintaining the pressure of 58.6 MPa the temperature is then lowered to 1000° C. over a period of 60 minutes after which the pressure is lowered to 170 psi (1172 KPa). The temperature is next decreased to 100° C. over 90 minutest the furnace is opened and the composite pieces are removed from the die set.

Two disc specimens according to Example 2 are found to have densities of 2.235 g/cc and 2.241 g/cc. The samples have a theoretical density at a ratio of quartz/SiC fiber of 75/25 of 2.278 g/cc. The bulk resistivity is found to be between $2.0 \times 10^4$ and $2.0 \times 10^5$ ohm-cm.

Example 3

Forty liters of water are thickened with 2 grams of xanthan gum thickener. Forty-three and one-half grams of 92% solids stainless steel fibers having a diameter of 8 $\mu$m and a length of 6 mm (commercially available from Bekaert under the trade designation Beckinox ™) are stirred for five minutes into the slurry in order to debundle the fibers. The stainless steel fibers as purchased are coated with polyvinylalcohol amounting to 8 weight percent of the total fiber weight. The polyvinylalcohol is water soluble. Next 17.14 grams of 35% solids ethylene acrylic acid copolymer dispersion (commercially available from The Dow Chemical Company under the trade designation Primacor ® 4990) and 35 grams of 40% solids polyethylene pulp (commercially available from Lextar, a Hercules-Solvay Company, under the trade designation Pulpex E ®) are added. Next, 140 grams of magnesia-alumina-silicate glass fibers having a length of 13 mm and a diameter of 13 $\mu$m (commercially available from Owens-Corning Fiberglas Corp. under the trade designation S-2 glass) are added. Stirring continues throughout the addition of ingredients and after until a uniform dispersion results. Finally the slurry is destabilized by adjusting the pH to acidic with 100 ml of 28 percent acetic acid.

Ten four-liter batches of the slurry are prepared into mats by draining destabilized slurries onto a screen. The aqueous media is visibly examined after passing through the screen. No fibers are observed. The aqueous media is translucent. These mats are passed through nip rolls to remove excess water and dried. Five of the mats, measuring 12 inches by 12 inches (30.5 centimeters by 30.5 centimeters), are pressed at 200° C. and 350 psi (2.4 MPa) in order to melt the binders and preconsolidate the mats. The resulting preconsolidated composite mat is square, about 12 inches (30.5 centimeters) on a side, and approximately 100 mils (0.25 cm) thick. It has a density which is 25% of the final theoretical density. Two of these preconsolidated mats are cut into a total of eight 6 inch by 6 inch (15.2 cm by 15.2 cm) pieces. The eight pieces are stacked and placed in a graphite die set which is then placed in a vacuum furnace. After a vacuum was drawn to 200 $\mu$m of Hg, the pressure on the dieset is set at 200 psi (1.4 MPa) and the press is heated to 770° C. This pressure and temperature combination is maintained for 20 minutes. The temperature is then increased to 1000° C. at which time the pressure is increased to 1000 psi (6.9 MPa). The 1000° C. and 1000 psi conditions are maintained for 50 minutes. The temperature is then lowered at a rate of 2.5° C. per minute to a temperature of 775° C. while maintaining 1000 psi pressure. At 775° C., the pressure is reduced to 200 psi (1.4MPa) and the furnace is turned off. Two hours later, the die set is removed from the furnace and allowed to cool in air to 100° C.

The hot-pressed stack of mat pieces has a density of 2.93 g/cc which equals the theoretical density. In other words, there are substantially no voids in the stack. The composite after hot pressing comprises 22 weight percent reinforcing fibers and 78 weight percent glass matrix. Strain gauge measurements of a portion of the stack using the three point bending mode provide an average flexural stress of 19810 psi (136.6 MPa) and an average flexural modulus of 14,600,000 psi (100.7 GPa).

Bulk resistivity in ohm-centimeters ($\Omega$cm) and electromagnetic interference (EMI) shielding values, determined the Aperture Box method, in decibels at various frequencies, as measured in megahertz (Mhz) are shown in the table which follows Example 5.

Example 4

Example 3 is duplicated with two exceptions. The amount of stainless steel fibers is reduced to 32.6 grams and the amount of glass fibers is increased to 150 grams. This provides a solids component of the mat material of having 75 weight percent glass fibers, 15 weight percent reinforcing fibers and ten weight percent binder materials. After hot pressing to form a glass matrix, the composite comprises 16.7 weight percent reinforcing fibers and 83.3 weight percent glass. A second method of determining EMI Shielding values is known as the Transmission Line method. Use of the second method of this example produced the following results: 30 MHz–58 dB; 100 MHz–58 dB; 300 MHz–61 dB; 1000 MHz–73 dB. The differences between these results and those in the table are due to the enhanced degree of accuracy of this method over the Aperture Box method.

Example 5

Example 3 is duplicated with two exceptions. The amount of stainless steel fibers is reduced to 21.7 grams and the amount of glass fibers is increased to 160 grams. This provides a solids component of the mat having 80 weight percent glass fibers, ten weight percent reinforcing fibers and ten weight percent binder materials. After hot pressing to form a glass matrix, the composite comprises 11 weight percent reinforcing fibers and 89 weight percent glass.

Example 6

Example 3 is duplicated with two exceptions. The amount of stainless steel fibers is reduced to 16.3 grams and the amount of glass fibers is increased to 165 grams. This provides a solids component of the mat material having 82.5 weight percent glass fibers, 7.5 weight percent reinforcing fibers and ten weight percent binder materials. After hot pressing to form a glass matrix, the composite comprises 8.3 weight percent reinforcing fibers and 91.7 weight percent glass.

Comparative Example A

An alternative method for preparing a glass matrix composite like that of Example 1 is as follows: adjust the pH of 28 liters of water to 8 with $NH_4OH$; add, with stirring, 112.9 grams of a 24.8% solids ethylene acrylic acid as a binder; add, with stirring, 206.6 g of glass microspheres and 50.4 g of nickel-coated graphite fibers (5 mm in length); adjust the pH to 4 by adding acetic acid to destabilize the suspension, drain the destabilized suspension using a screen to form a wet mat; dewater the wet mat by passing it through nip rolls; and dry the dewatered mat. The dried mat is then hot pressed into a glass matrix composite. The theoretical volume percent of reinforcing fibers in the hot-pressed glass matrix composite is 17.9. The actual volume percent of nickel-coated graphite fibers in the hot-pressed glass matrix composite is 46.8.

The difference between the theoretical and and actual results is explained by loss of glass microspheres during mat formation and subsequent dewatering and by loss of glass matrix material during hot pressing of the mats. Although the latter loss can be minimized by tighter control of hot pressing conditions, the former loss is difficult to minimize.

By way of contrast, no loss of matrix material or reinforcing fibers is observed in Examples 1–6 wherein the matrix material is in the form of glass fibers.

Example 7

Four liters of water are thickened with 0.5 g of xanthan gum. Approximately 1.4 g ethylene acrylic acid copolymer dispersion (0.35 g solids) are added, with stirring, to the thickened water. Next, approximately 2.02 g Pulpex E polyethylene minifiber pulp (1.21 g solids), predispersed in a blender, is added. This is followed by the addition of 12.97 g of 6.35 mm quartz fibers and 4.33 g of 9 mm silicon carbide fibers. All the ingredients are stirred until a uniform dispersion is obtained. The pH is adjusted to the acidic level (approximately pH 4) with acetic acid to destabilize the suspension. The slurry is drained onto a screen to form a mat which is then dewatered, pressed and dried. Mats formed in this manner are approximately 1 mm in thickness and have excellent wet and dry strength.

Four of the dried mats are stacked onto each other and molded at 200° C., 350 psi (2.41 MPa) in order to melt the binders and partially consolidate the mats. The resulting partially consolidated mat has a thickness of approximately 1.5 mm and a density which is approximately 25 percent of theoretical density.

Round discs of the partially densified mat are cut (3.81 cm diameter) and stacked in a graphite die set. A total of eleven of these discs (10.02 g) are placed in the mold. Graphite foil discs (0.013 cm) are placed between the rams and the material to prevent sticking after solidification and compaction. The die set is placed into a hot press furnace and pressed. The mold (die set) is heated in an argon-purged vacuum to 600° C. in approximately 20 minutes under a pressure of 70 lbs (40 psi or 276 Pa) and held at this temperature and pressure for 30 minutes to burn off the binders. The temperature is then increased to 1,645° C. over a period of 1 hour after which the pressure is increased to 1,770 lbs (1,000 psi or 6.9 MPa). This combination of temperature and pressure is held for 15 minutes. The temperature is then lowered to 1,000° C. after which the pressure is reduced to 300 lbs (170 psi or 1.2 MPa). Finally, the temperature is reduced to 100° C. and the furnace is opened. The mold is then opened and the molded article is removed. The molded article has quasi-isotropic properties and a den-

TABLE

| | | | Resistivity/Shielding Data | | | | |
|---|---|---|---|---|---|---|---|
| Example Number | Weight Percent Reinforcing Fibers | Volume Percent Reinforcing Fibers | Resistivity ($\Omega$cm) | Shielding Data (dB) at Various Frequencies | | | |
| | | | | 30 (Mhz) | 100 (Mhz) | 300 (Mhz) | 1000 (Mhz) |
| 5 | 11.0 | 4 | 0.49 | 55 | 37 | 36 | 57 |
| 4 | 16.7 | 6 | 0.21 | 68 | 48 | 44 | 66 |
| 3 | 22.2 | 8 | 0.08 | 64 | 58 | 45 | 65 | sity of 2.252 g/cc which corresponds to 1.1 percent residual porosity (theoretical density was 2.278 g/cc). No extrusion of quartz was observed.

Comparative Example B

One hundred sixty grams of borosilicate glass microspheres (commercially available from PQ Industries under the trade designation 3000 E) and 40 grams of 9 mm long silicon carbide (SIC) fibers (commercially available from Dow Corning Corporation under the trade designation Nicalon ®) are slurried in 14 liters of water. The pH is adjusted to 8 with NH$_4$OH. Next, 64.5 grams of 25% solids ethylene acrylic acid copolymer dispersion (commercially available from The Dow Chemical Company under the trade designation Primacor ® 4983) are added with stirring. All of the ingredients are stirred until a uniform dispersion is obtained. The pH is then adjusted to four with acetic acid to destabilize the slurry. The destabilized slurry is drained onto a screen and formed into a mat. The mat is passed through nip rolls to remove excess water and then dried.

The dried composite mat is then cut into three inch by three inch (7.6 cm by 7.6 cm) squares. Enough of the mats to provide a total weight of 55.5 grams are stacked in a graphite mold which is placed in a furnace and purged with argon to remove oxygen. The furnace is then evacuated to a vacuum of 28 (71 cm Hg) inches Hg (i.e. a pressure of 2 inches of Hg, 5 cm Hg) and the temperature is increased to 600° C. over a period of 5 minutes. After 10 minutes, the pressure is increased to 228 psi (1.6 MPa) and the temperature is increased, over a twenty minute period, to 800° C. Next, the pressure is increased to 1013 psi (7 MPa) and the temperature is increased, over a 45 minute period, to 1,175° C. The pressure is then further increased to 1563 psi (10.8 MPa) after which the temperature is raised to 1275° C. over a ten minute period. The pressure is further increased to 2163 psi (14.9 MPa) and maintained at that level for a period of 150 minutes while the temperature is allowed to fall to 800° C. The pressure is then decreased to 1660 psi (11.4 MPa) and the temperature is allowed to fall to 740° C. at which time the pressure is further decreased to 1010 psi (7 MPa). Further cooling takes place over 95 minutes as the temperature falls to 200° C., after which the pressure is decreased to 228 psi (1.6 MPa). After further cooling to 80° C., pressure is relieved, the press is opened and a hot-pressed composite is removed from the mold.

The hot-pressed composite has a density of 2.517 g/cc which corresponds to 1.1 percent residual porosity (theoretical density of 2.545 g/cc).

Example 8

A small piece of the composite, measuring 1.0 by 1.0 by 0.055 inch (2.54 by 2.54 by 0.13 cm) and weighing 2.26 grams, is placed into a furnace and heated in air to a temperature of 840° C. and maintained at that temperature for 60 minutes. The furnace is then cooled and the piece is removed from the furnace. The composites new dimensions are 1.003 by 1.003 by 0.0723 inch. No loss of material is observed. The new density is 1.89 g/cc. By dividing the difference between the thickness after heating and before heating by the thickness before heating a lofting percentage of 32 is calculated.

Although the densified composite is not made by the process of the present invention because glass particles rather than glass fibers are used to prepare the composite mats which are subsequently hot pressed to fully consolidate the composite similar results are obtained with densified composites prepared in accordance with the present invention, e.g., the composite formed in Example 7.

What is claimed is:

1. A process for preparing a fiber-reinforced, glass matrix composite article of manufacture comprising
    a. forming a dilute, aqueous slurry naming a solids component comprising (1) from about 3 to about 35 volume percent reinforcing fibers, (2) from about 45 to about 97 volume percent glass matrix fibers, and (3) from about 1 to about 20 volume percent of at least one binder material;
    b. destabilizing said aqueous slurry;
    c. collecting said solids component on a porous support;
    d. dewatering and drying said collected solids to form a dried composite mat wherein the reinforcing fibers and the glass matrix fibers are commingled and randomly oriented in the plane of the mat; and
    e. stacking a plurality of said mats, or sections thereof, and hot pressing said stack under conditions sufficient to fuse the glass matrix fibers into a continuous glass matrix while substantially eliminating the binder material and retaining the integrity of the reinforcing fibers, wherein the volume fraction of reinforcing fibers relative to the glass matrix fibers is generally identical to the volume fraction of the reinforcing fibers relative to the glass matrix fibers in the solids component of the dilute aqueous slurry.

2. The process of claim 1 wherein the reinforcing fibers are selected from the group consisting of graphite fibers, metal coated graphite fibers, silica fibers, quartz fibers, ceramic fibers, metal fibers and mixtures thereof, the metal of the metal fibers and the metal coated graphite fibers being a material which, under the hot pressing conditions, is substantially inert to materials of construction for molds used in hot pressing.

3. The process of claim 2 wherein the reinforcing fibers are selected from the group consisting of stainless steel fibers and nickel coated graphite fibers.

4. The process of claim 1 wherein the binder material is a synthetic or natural polymer.

5. The process of claim 4 wherein the binder is selected from the group consisting of ethylene/acrylic acid copolymers, polyolefin fibers, and mixtures thereof.

6. The process of claim 1 further comprising an additional step:
    f. heating the hot-pressed composite article, in the absence of pressure, to a temperature above that at which softening of the glass matrix occurs but below that at which the reinforcing fibers degrade and maintaining the composite article within that temperature range for a period of time sufficient to cause the composite article to increase in thickness.

7. The process of claim 6 wherein the increase in thickness is at least 5 percent, based upon the quotient of the difference in thickness divided by the original thickness.

8. The process of claim 6 wherein the increase in thickness is at least 30 percent, based upon the quotient of the difference in thickness divided by the original thickness.

* * * * *

UNITED STATES PATENT AND TRADEMARK OFFICE
CERTIFICATE OF CORRECTION

PATENT NO.  : 5,422,055
DATED       : June 6, 1995
INVENTOR(S) : Selim Yalvac & Robert L. McGee It is certified that error appears in the above-indentified patent and that said Letters Patent is hereby corrected as shown below:

Column 12, line 9, delete "naming" and insert therefore --having--.

Signed and Sealed this

Fifth Day of August, 1997

Attest:

BRUCE LEHMAN

Attesting Officer    Commissioner of Patents and Trademarks